Dec. 14, 1965    F. B. MONEY    3,222,861
METHOD FOR PRODUCING INTEGRAL STUDS IN LINK
ANCHOR-CHAIN BY PROJECTION WELDING
Filed July 1, 1963

INVENTOR
FRED B. MONEY

BY Cushman, Darby & Cushman
ATTORNEYS

United States Patent Office 3,222,861
Patented Dec. 14, 1965

3,222,861
METHOD FOR PRODUCING INTEGRAL STUDS IN LINK ANCHOR-CHAIN BY PROJECTION WELDING
Fred B. Money, Thorofare, N.J., assignor to Baldt Anchor, Chain & Forge Division of The Boston Metals Company, Chester, Pa., a corporation of Maryland
7 Claims. (Cl. 59—35)

This invention relates to chain links, and in particular to an improved method of manufacture.

Generally speaking, in marine practice plain chain designates a well known type of chain usually made by bending short round rods of steel or the like into individual oval links. The rod ends in each link are conventionally joined together as by butt-welding, as each successive ling is interlaced with the preceding link, producing a flexible string of successive single links capable of resisting considerable tensile force. The size of a chain ordinarily is determined by and has reference to the diameter of the rod from which the links are fabricated. Sizes commonly attain three inches or even higher.

Some disadvantages, however, are attendant with the use of plain chain in an environment where excessive tension forces are placed on the chain. Thus in situations where a chain is to be employed, for instance, as an anchor cahin, a plain chain is vulnerable to lateral collapse, etc. In order to overcome the disadvantages associated with the plain-type chain, manufacturers have devised a stud link chain which in essence is a series of interconnected plain chain links, each link being provided with a central cross member called a "stud". These studs serve to stiffen or reinforce the sides of the link against possible lateral collapse which would cause a lengthening of the links. Such lengthening is undesirable since it causes the links to no longer match the pitch of the link pockets of the chain windlass. Furthermore, the studs serve to prevent kinking and tangling of the chain when piled at random in the chain locker or on the ocean floor.

While there are presently available a number of types of stud link chain, it seems that each of them has at least some disadvantage which makes them unsatisfactory for general use. For example, many conventional stud links are formed either by precasting or preforging the studs, providing smoothly concave ends to engage the peripheral surface of the links when inserted therein. Generally, the studs are attached to the link while the link is still hot from a welding operation performed to join its free ends. The cold, preformed stud is positioned in place and the longitudinal sides of the hot link are firmly pressed or driven in against the concave ends of the stud. When the link cools, the stud is held in place by the frictional forces set up by the shrinkage stresses thus engendered. In an effort to improve this method and type of stud link, manufacturers have provided within the concave ends of the stud small sharp projections, which, being cold in the process of forming the stud link, are forced slightly during the link pressing procedure, into the generally convex peripheral surface of the longitudinal sides of the link. This expedient augments the frictional force to retain the stud in place and thus prevents to some degree the studs from slipping out of their centrally disposed position, or from becoming loosened or lost entirely.

Such methods of construction have obvious disadvantages. For instance, it will be recognized that the fastening of the inserted stud in the manner described is not positive, and the hazards of slippage and loss of the stud are great enough that safety-oriented purchasers increasingly are demanding anchor chains in which the stud of the stud link is in effect an integral and substantially totally inseparable component of the link itself. Such demands are presently forcing manuacturers of anchor and other chains to implement prohibitively expensive manufacturing processes, such as casting, drop-forging or the like, to produce a stud link wherein the stud is made integral with the link.

It is therefore a primary object of the present invention to provide a simple and efficient method especially advantageous for the manufacture of large and heavy stud links, of the type used in anchor chains, in which the studs are integrally joined to the links and proof against displacement and loss. The method, also, is well suited to the efficient production of continuous chain, and adapted to facilitate the insertion into chain of stud links. These and other objects of the present invention will become apparent from consideration of the present specification taken in conjunction with the accompanying drawing in which:

Figure 1:
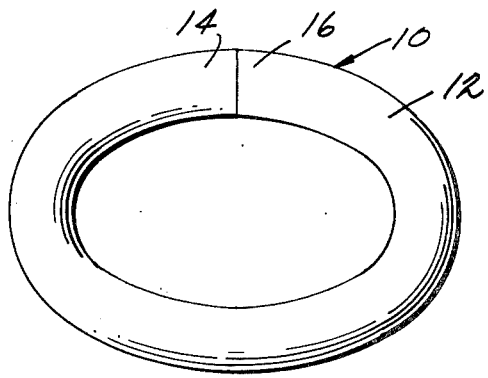
FIGURE 1 is a side elevational view of a link conventionally and economically formed from a round rod blank and conventionally flash butt welded.

Referring to the drawing, FIGURE 1 shows a length of metal rod indicated generally as 10. The length 10 may be bar stock of circular cross section, of steel or the like, cut to desired length by sawing, shearing, burning or other conventional method.

Initially, the length 10 is bent into oval link form 12 so that its ends 14 and 16 abut each other, and the ends are then integrally joined in conventional fashion, as by butt-welding. The bending of length 10 into link form may be facilitated by heating, if desired.

Figure 2:
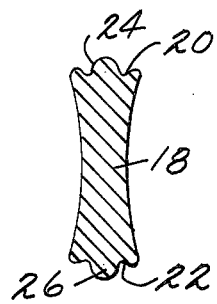
FIGURE 2 is a cross-sectional elevational view of a stud employed in the instant invention.

As shown in FIGURE 2, a preformed stud is employed in the invention, comprising an elongated member 18 generally of substantially circular cross section, having ends 20 and 22 each defining a concave and generally cylindrical surface. Centrally disposed within the concavities of ends 20 and 22 and extending outwardly therefrom are substantially dome-topped cylindrical projections 24 and 26, respectively. These projections serve as a source of heat for electrical resistance projection welding by localizing resistance at the predetermined locations provided thereby. The projections 24 and 26 may be provided on the stud ends by forging, casting, machining or in any other conventional manner. Conveniently, the stud may have a diameter equal to that of the stock from which the link is made, and a length about 1.5 times the diameter of the rod stock.

Figure 3:
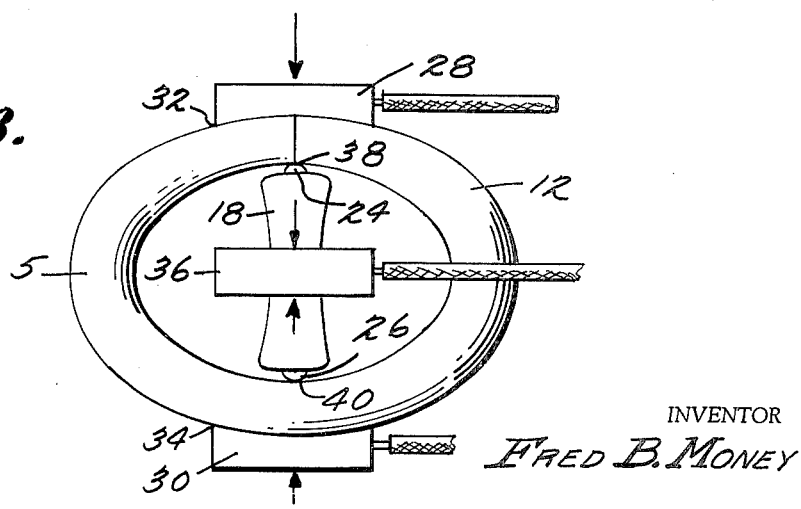
FIGURE 3 is a side elevational view of the stud of FIGURE 2 centrally disposed within the link of FIGURE 1 and ready for resistance projection welding to produce the integral stud link of the invention.

FIGURE 3 shows the stud member 18 positioned within the link 12, and ready for resistance projection welding treatment in accordance with the present invention, by which procedure the elements are integrally joined to each other. As shown, the projections 24 and 26 are aligned with and abut or adjoin the inner surfaces of the longitudinal sides 32 and 34 of link 12, and electrodes 28 and 30 engage the outer surfaces thereof, while electrode 36 engages the central portion of the stud 18. The electrodes are connected to a suitable source of electrical power not shown, by appropriate conductors, and are of conventional type, for example made from copper alloyed with metal such as molybdenum and tungsten, thus exhibiting high electrical conductivity, good thermal conductivity, and adequate mechanical strength to withstand the pressures to which they are subjected. Conveniently, the electrodes are water cooled.

It is evident that to join the stud 18 to the link 12, two welds must be made, one at each end of the link. It has been found exceedingly difficult to make these welds simultaneously by projection welding; at best, inefficient and sometimes defective welds are produced. In accordance with the present invention, the respective welds are accomplished sequentially, whereby superior welds are effected, and the stud is integrally joined to the link. In accordance with this procedure, for example, appropriate electrical current is initially passed through electrode 36, stud 18, projection 24, link 12 and electrode 28, with the electrodes 28 and 36 pressed toward each other, thereby upsetting the projection 24 and forming an effective and positive weld at 38. Thereafter, current is passed through electrode 36, stud 18, projection 26, link 12 and electrode 30, while electrodes 36 and 30 are pressed toward each other, to form an efficient projection weld at the position 40. In making the respective welds, it is most efficient to use the maximum current which can be employed without splashing of the metal; appropriate current for efficient welding of any size link will be known to or readily determined by those skilled in the art. The welding pressure should be such as to insure complete flattening of the projections 24 and 26 in the course of forming the respective welds. As will be evident, excessive pressure may cause premature collapse of the projections. Appropriate pressures for efficient projection welding will be known to or readily determined by those skilled in the art.

The method described lends itself to efficient assembly of either individual links or continuous chain. As will be evident, a plurality of individual links prior to the closing bend and welding steps illustrated in FIGURE 1 may be disposed in assembled relationship, and may then be successively subjected to closing and welding, with subsequent projection welding of studs therein as shown in FIGURE 3, whereby a continuous chain may be produced on a substantial assembly line basis. Similarly, the links may be manufactured successively, each interlaced with a preceding link at the end of a chain before closing, welding and stud joining, to produce continuous chain lengths. As will be evident, stud links may be alternated in a continuous chain with solid links. The method described results in superior chain, having studs positively engaged in links thereof, and proof against displacement or loss. The welding procedures described lend themselves to high production rates, and reduced cost of manufacture and assembly.

It will thus be seen that there has been provided by this invention a method in which the various objects hereinbefore set forth, together with many practical advantages, are successfully achieved. As various possible embodiments may be made with the novel features of the invention, all without departing from the scope thereof, it is to be understood that all matter hereinbefore set forth or shown in the accompanying drawing is to be interpreted as illustrative, and not in a limiting sense.

What is claimed is:

1. A method of forming an integral stud link which comprises the steps of bending a length of metal bar into oval link form, closing the link and joining the abutting ends thereof, providing a stud at each of its outer ends with a zone defining a localized path for electric current, disposing said stud within the link, said zones adjoining the inner surfaces of the longitudinal sides of the link and resistance projection welding said stud to said link whereby said zones are upset to integrally join said stud to said link.

2. The method as defined in claim 1 wherein said zones comprise a central dome-shaped projection and said outer ends are generally concave.

3. The method as defined in claim 1 wherein the projection welding of respective ends of said stud to said link is carried out sequentially.

4. A method of forming an integral stud link which comprises the steps of providing a stud at each of its outer ends with a zone defining a localized path for electric current, disposing said stud within a link with said zones adjoining the inner surfaces of the longitudinal sides of the link, resistance projection welding one end of said stud to said link whereby one of said zones is upset to integrally join one of said stud ends to said link and then resistance projection welding the other end of said stud to said link whereby the other of said zones is upset to integrally join the other of said stud ends to said link.

5. The method as defined in claim 4 wherein said zones comprise a central dome-shaped projection and said outer ends are generally concave.

6. A method of forming continuous chain which comprises the steps of bending a length of metal bar into oval link form, threading the length through a previously formed link, closing and joining the abutting ends of said length, providing a stud at each of its outer ends with a zone defining a localized path for electric current, disposing said stud within the newly formed link with said zones adjoining the inner surfaces of the longitudinal sides of the link and resistance projection welding said stud to said link whereby said zones are upset to integrally join said stud to said link.

7. A method of forming continuous chain which comprises the steps of bending a length of metal bar into oval link form, threading the length through a previously formed link, closing and joining the abutting ends of said length by butt welding, providing a stud at each of its outer ends with a zone defining a localized path for electric current, said zones comprising a central dome-shaped projection and said outer ends being generally concave, disposing said stud within the newly formed link with said zones adjoining the inner surfaces of the longitudinal sides of the link, resistance projection welding one end of said stud to said link whereby one of said zones is upset to integrally join one of said stud ends to said link and then resistance projection welding the other end of said stud to said link whereby the other of said zones is upset to integrally join the other of said stud ends to said link.

References Cited by the Examiner

UNITED STATES PATENTS

| | | | |
|---|---|---|---|
| 2,021,157 | 11/1935 | Stahl | 59—31 |
| 2,247,837 | 7/1941 | Gordon | 59—84 |
| 2,439,522 | 4/1948 | Miller | 59—35 |
| 2,763,768 | 9/1956 | Coffey | 59—31 |

FOREIGN PATENTS 424,823    2/1935    Great Britain.

CHARLES W. LANHAM, *Primary Examiner.*

WILLIAM J. STEPHENSON, CHARLES W. LANHAM, G. P. CROSBY, *Assistant Examiners.*